US009126476B2

(12) United States Patent
Takahashi

(10) Patent No.: US 9,126,476 B2
(45) Date of Patent: Sep. 8, 2015

(54) IN-WHEEL MOTOR DRIVE ASSEMBLY

(71) Applicant: NTN CORPORATION, Osaka (JP)

(72) Inventor: Toru Takahashi, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/354,327

(22) PCT Filed: Oct. 24, 2012

(86) PCT No.: PCT/JP2012/077477
§ 371 (c)(1),
(2) Date: Apr. 25, 2014

(87) PCT Pub. No.: WO2013/062005
PCT Pub. Date: May 2, 2013

(65) Prior Publication Data
US 2014/0300175 A1 Oct. 9, 2014

(30) Foreign Application Priority Data
Oct. 28, 2011 (JP) ................................. 2011-237260

(51) Int. Cl.
*B60K 7/00* (2006.01)
*B60G 3/20* (2006.01)
(Continued)

(52) U.S. Cl.
CPC ................ *B60K 7/0007* (2013.01); *B60G 3/20* (2013.01); *B60K 17/043* (2013.01); *G01L 5/0009* (2013.01); *B60B 27/00* (2013.01); *B60B 27/0005* (2013.01); *B60B 27/0031* (2013.01); *B60B 27/0073* (2013.01); *B60G 2200/144* (2013.01); *B60G 2204/30* (2013.01);
(Continued)

(58) Field of Classification Search
CPC ........... B60K 7/00; B60K 7/0007; B60K 6/26
USPC ......... 180/65.51, 65.6, 65.285; 903/909, 947, 903/952; 701/22, 70
See application file for complete search history.

(56) References Cited

U.S. PATENT DOCUMENTS 8,167,497 B2 * 5/2012 Ozaki et al. .................. 384/448
8,307,931 B2 * 11/2012 Akamatsu ................. 180/65.51

FOREIGN PATENT DOCUMENTS

JP 10-271607 10/1998
JP 2005-207953 8/2005
(Continued)

OTHER PUBLICATIONS

Mechanical translation of JP2008-081089, Apr. 10, 2008.*
(Continued)

*Primary Examiner* — John Walters
(74) *Attorney, Agent, or Firm* — Clark & Brody

(57) ABSTRACT

An in-wheel motor drive assembly (11) includes a motor unit that drivingly rotates a motor-side rotating member, a speed reduction unit that reduces the rotational speed of the motor-side rotating member and transmits the reduced rotation to a wheel-side rotating member, a wheel hub (26) that is fixedly coupled to the wheel-side rotating member, a wheel hub bearing that rotatably supports the wheel hub (26), a casing (12) that covers the motor unit, the speed reduction unit, and the wheel hub bearing, a plurality of sensors (43) that are mounted on the casing (12) and capable of detecting strain generated in the casing (12), and a signal processor (46) that calculates load imposed on a wheel on the basis of strain signals output from the sensors (43).

10 Claims, 8 Drawing Sheets

(51) Int. Cl.
*G01L 5/00* (2006.01)
*B60K 17/04* (2006.01)
*B60B 27/00* (2006.01)

(52) U.S. Cl.
CPC .... *B60G 2300/50* (2013.01); *B60K 2007/0038* (2013.01); *B60K 2007/0092* (2013.01)

(56) References Cited

FOREIGN PATENT DOCUMENTS

| | | |
|---|---|---|
| JP | 2008-081089 | 4/2008 |
| JP | 2008-081090 | 4/2008 |
| JP | 2008-126733 | 6/2008 |
| JP | 2008-143490 | 6/2008 |
| JP | 2011-133101 | 7/2011 |
| JP | 2011-133380 | 7/2011 |

OTHER PUBLICATIONS

Mechanical translation of JP2008-126733, Jun. 5, 2008.*
Mechanical translation of JP10-271607, Oct. 9, 1998.*

* cited by examiner 11
60
40a
40
12d
40c
40
12a
12
12b
44
43
45a
41a
12c
41c
43
45c
44
50
26
II 11
26
12c
41b
45b
43
12
44
12b
44
44
12a
46
47
44
45d
43
41c
49
48
40
40c
40
40b
12d
60

V
11
12
12c
12b
12a
35
18
18b
18a
56
23a
12e
24
12d
39
13
14
26
26a
21
22b
18c
15
19
20
17
26b
38
37
36
22a
16
32
33
23b
25
41c
42
V
C
B
A traveling direction
51
60
11
50
26
54
52
53
z
r
y
x signal processor 46
55
controller
motor unit
electric brake
suspension

IN-WHEEL MOTOR DRIVE ASSEMBLY

TECHNICAL FIELD

This invention relates to in-wheel motor drive assemblies, and more particularly to an in-wheel motor drive assembly provided with sensors.

BACKGROUND ART

Highly-accurate control over in-wheel motor drive assemblies can be achieved by estimating the state of contact between a wheel and a road surface. To estimate the contact state between the wheel and the road surface, conventionally adopted methods include measuring the load imposed on the main body of an in-wheel motor drive assembly by a load sensor mounted on the main body of the in-wheel motor drive assembly. Such an in-wheel motor drive assembly is disclosed, for example, in PTL 1.

CITATION LIST

Patent Literature

PTL1: Japanese Unexamined Patent Application Publication No. 2011-133101

SUMMARY OF INVENTION

Technical Problem

The in-wheel motor drive assembly described in PTL 1 includes a wheel hub bearing that rotatably supports a wheel hub and load sensors that are mounted on an outer ring of the wheel hub bearing. However, as described in PTL 1, the load sensors configured to be mounted on the outer ring causes the following problems.

A plurality of rolling elements are held on the inner diameter side of the outer ring and revolve along the raceway of the outer ring. The revolution of the rolling elements causes minute strain on the outer ring. Thus generated strain is detected by the load sensors mounted on the outer ring as strain information. The strain information derived from revolution of the rolling elements does not contribute to estimation of the contact state of the wheel and therefore needs to be precluded by signal processing or other techniques. Hence, the in-wheel motor drive assembly disclosed in PTL 1 faces problems of increasing in complexity of signal processing algorithms and thereby producing time delay.

In addition, since the load sensors are mounted on the outer ring, the load sensors cannot detect torque imposed on the wheel in the rotational direction. Thus, the technique disclosed in PTL 1 is not enough to control the in-wheel motor drive assembly with high accuracy.

In view of the circumstances, the present invention has an object to provide an in-wheel motor drive assembly controllable with high accuracy and a simpler configuration.

Solution to Problem

The in-wheel motor drive assembly according to the present invention includes a motor unit that drivingly rotates a motor-side rotating member, a speed reduction unit that reduces the rotational speed of the motor-side rotating member and transmits the reduced rotation to a wheel-side rotating member, a wheel hub that is fixedly coupled to the wheel-side rotating member, a wheel hub bearing that rotatably supports the wheel hub, a casing that covers the motor unit, the speed reduction unit, and the wheel hub bearing, a plurality of sensors that are mounted on the casing and capable of detecting strain generated in the casing, and a signal processor that calculates load imposed on a wheel on the basis of strain signals output from the sensors.

This configuration enables reduction of noise components that do not contribute to calculations of load imposed on the wheel due to revolution or the like of rolling elements. This noise reduction can simplify calculation processing and shorten the time delay caused by filtering processing. In short, load imposed on the wheel can be calculated through simpler algorithms with higher accuracy.

The sensors can be mounted on the inside of the casing. Alternatively, the sensors may be mounted on the outside of the casing and enclosed with a cover from the outer side.

Preferably, the in-wheel motor drive assembly further includes suspension arms each having one end coupled to the casing and the other end coupled to a suspension supporting the vehicle body, wherein the sensors are mounted in the vicinities where the suspension arms are coupled to the casing. This configuration allows the sensors that are mounted in the coupling areas where pronounced strain appears to effectively detect strain generated in the casing.

Preferably, each of the sensors can detect strain in a plurality of directions by itself. This configuration can reduce the number of sensors to be used, thereby reducing in manufacturing costs.

Preferably, an electric cable extending from each of the sensors is fastened by a cable fastening member provided on the casing. Since this configuration can prevent the electric cable from vibrating, it is also possible to prevent the electrical signals passing through the electric cables from noise contamination caused by vibration and to increase durability of the electric cables.

Preferably, the signal processor can calculate loads in at least three directions imposed on the wheel and rotational torque generated in rotational direction r of the wheel based on output signals from the sensors, and the three directions include a direction x along a traveling direction of the vehicle, a rotation axis direction y of the wheel, and a vertical direction z.

More preferably, the signal processor can also calculate rotational moment generated around the direction x and rotational moment generated around the vertical direction z. According to this configuration, the condition of contact between the wheel and road surface can be effectively calculated by detecting the loads in the three directions on the wheel. In addition, a braking force derived from a mechanical brake and regeneration of the motor can be calculated by detecting rotational torque generated in the rotational direction r of the wheel.

Preferably, the in-wheel motor assembly further includes a temperature sensor disposed in the vicinity of the sensors. The signal processor corrects output signals from the sensors based on output signals from the temperature sensor. According to the configuration, the strain information detected by the sensors is not affected by heat generated from the motor and speed reducer. Therefore, it makes it possible to calculate load imposed on the wheel with higher accuracy.

The signal processor can be mounted on the casing.

Preferably, an electric cable extending from the signal processor is fastened by a cable fastening member provided on the casing and is laid toward the vehicle body. Since this configuration can prevent the electric cable from vibrating, it is also possible to prevent the electrical signals passing through the electric cables from noise disturbance caused by vibration and to increase durability of the electric cables.

Preferably, the signal processor includes an amplification section that amplifies output signals from the sensors and an A/D conversion section that converts analogue signals output from the sensors into digital signals.

More preferably, the signal processor further includes a storage section that stores calculation parameters required to determine force imposed on the wheel.

More preferably, the signal processor further includes an I/F section that is connected to a controller provided on the vehicle body side via a communication section, such as a CAN bus, to enable setting of the calculation parameters from the controller. According to this configuration, the signal processor and the controller provided on the vehicle body can communicate by transmitting and receiving digital signals, which makes the digital signals less susceptible to noise and therefore enhances the detection accuracy.

More preferably, the in-wheel motor drive assembly further includes the controller that is provided on the vehicle body side to control the driving of the in-wheel motor drive assembly. The controller compares rotational torque generated in the rotational direction r of the wheel obtained through calculations by the signal processor and regenerative torque generated by the motor unit to calculate the ratio between a mechanical braking force produced by a mechanical brake and a regenerative braking force produced by the motor unit in a regeneration state.

More preferably, the controller controls the driving of the in-wheel motor drive assembly on the basis of the ratio between the mechanical braking force and the regenerative braking force. According to this configuration, the mechanical braking force of the mechanical brake can be calculated by the controller, and therefore the controller can cooperatively control the braking forces while keeping a balance between the mechanical braking force and the regenerative braking force generated through regeneration of the motor. Accordingly, more sophisticated control over the in-wheel motor drive assembly can be achieved.

Advantageous Effects of Invention

This invention enables reduction of noise components that do not contribute to calculations of load imposed on the wheel due to revolution or the like of rolling elements. This reduction of noise can simplify calculation processing and shorten the time delay caused by filtering processing. In short, load imposed on the wheel can be calculated through simpler algorithms with higher accuracy.

DESCRIPTION OF EMBODIMENT

Figure 1:
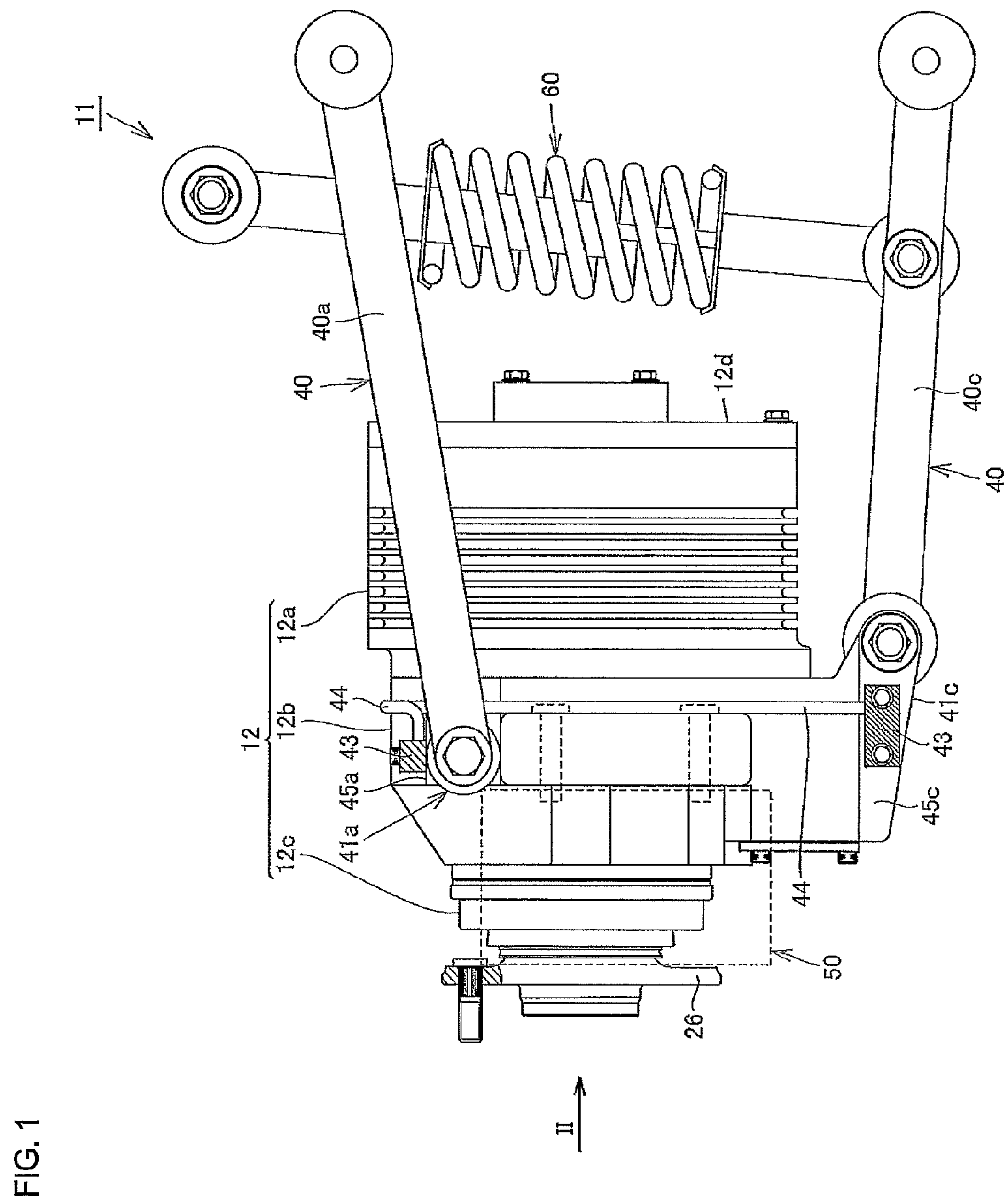
FIG. 1 illustrates the appearance of an in-wheel motor drive assembly viewed from the front side according to an embodiment of the present invention.
Figure 2:
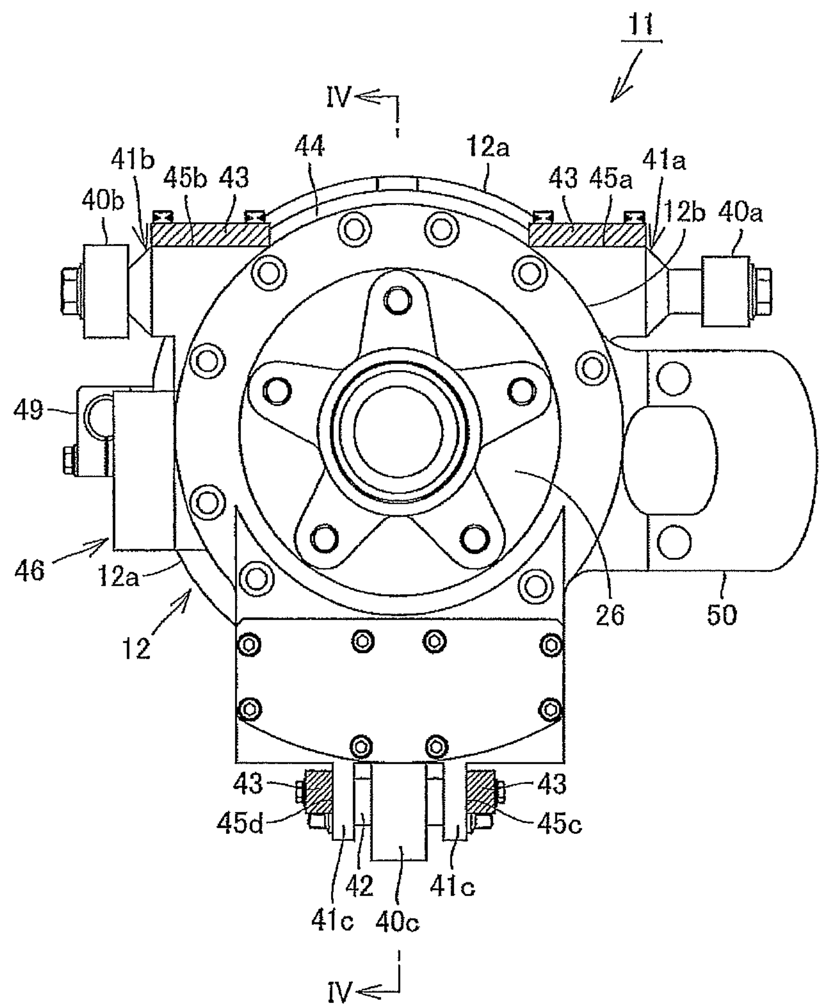
FIG. 2 illustrates the appearance of the in-wheel motor drive assembly of FIG. 1, viewed along arrow II in FIG. 1.
Figure 3:
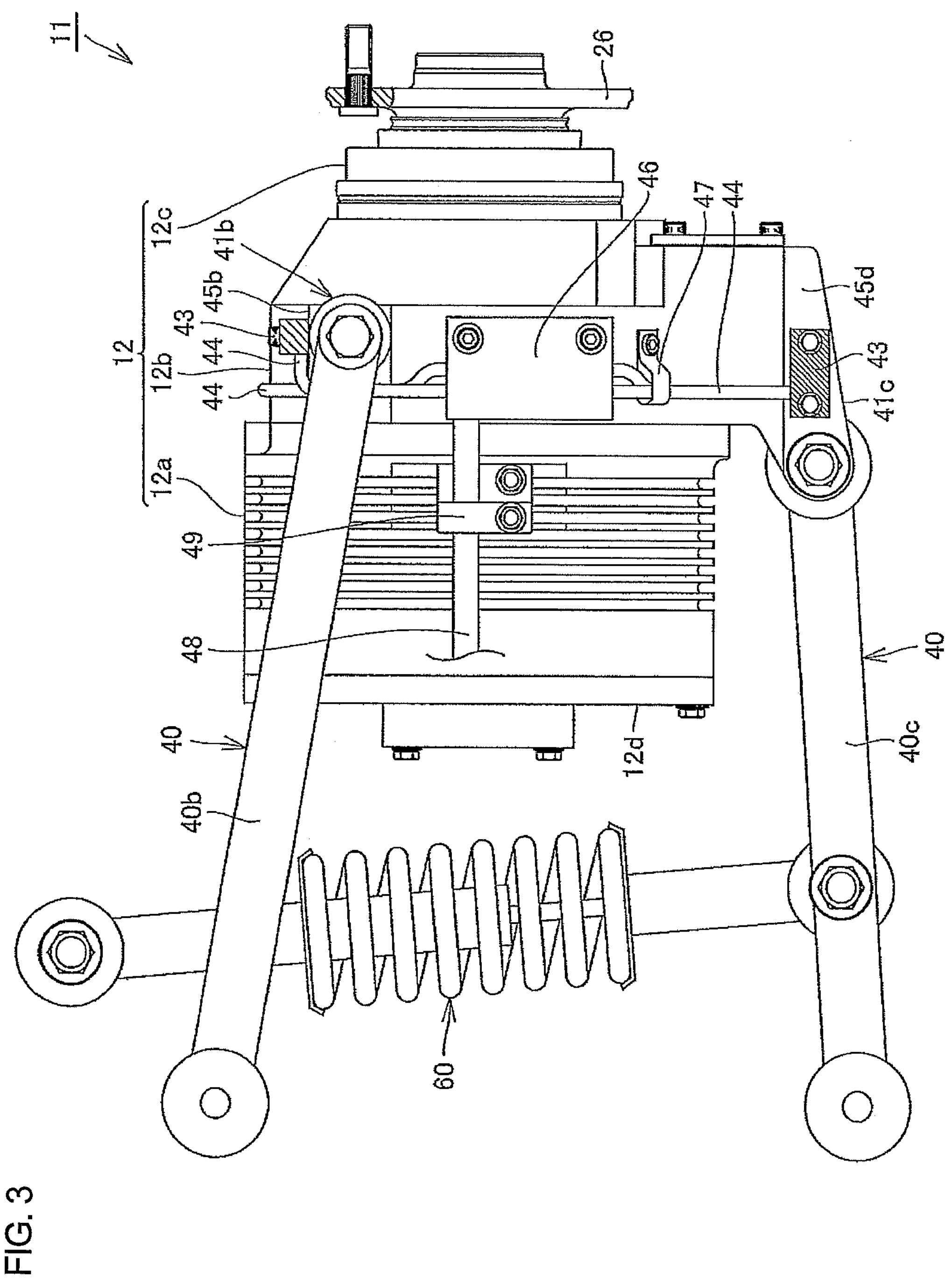
FIG. 3 illustrates the appearance of the in-wheel motor drive assembly of FIG. 1, viewed from the rear side.
Figure 4:
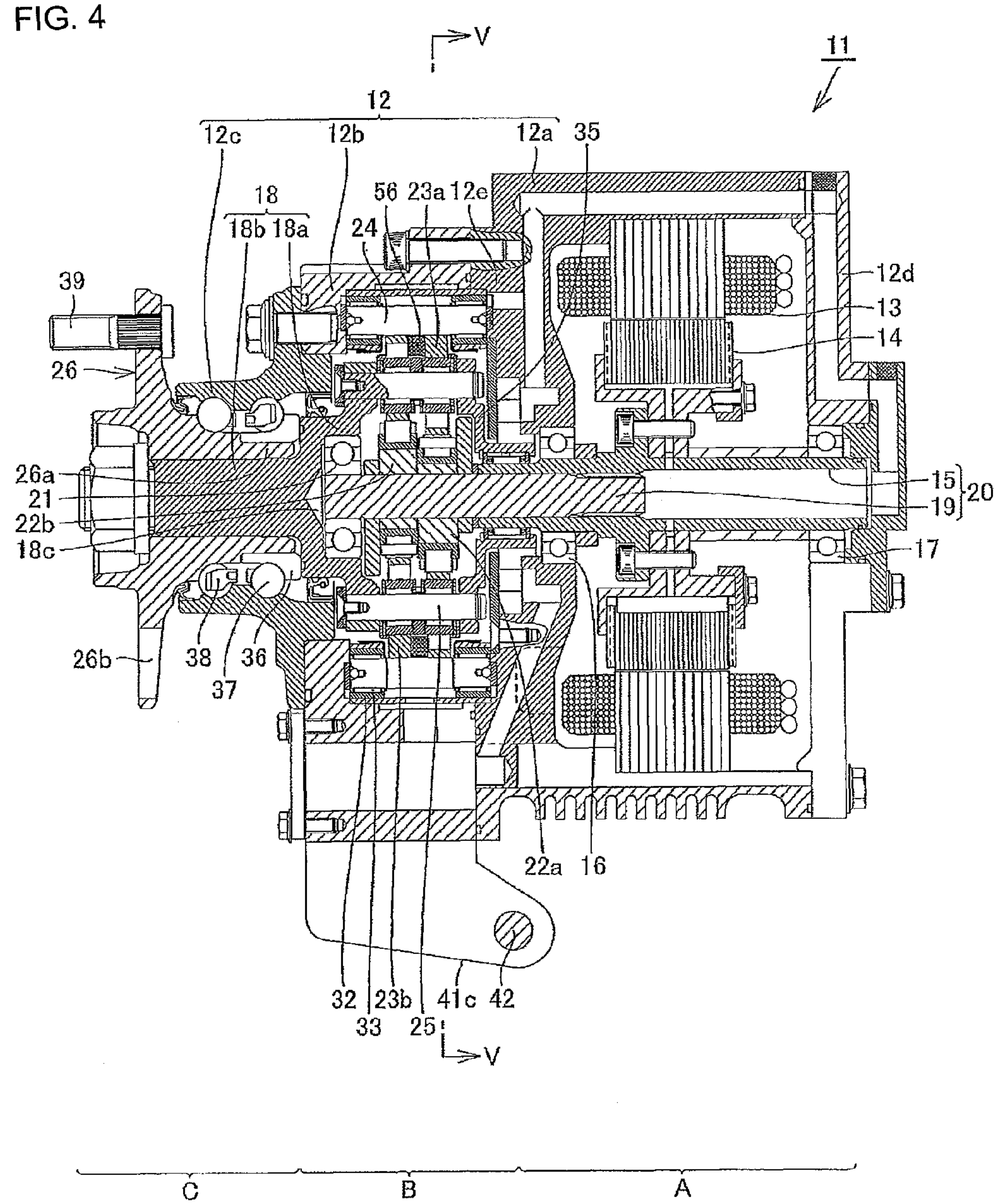
FIG. 4 is a cross-sectional view of the in-wheel motor drive assembly of FIG. 2, taken along the line IV-IV in FIG. 2.
Figure 5:
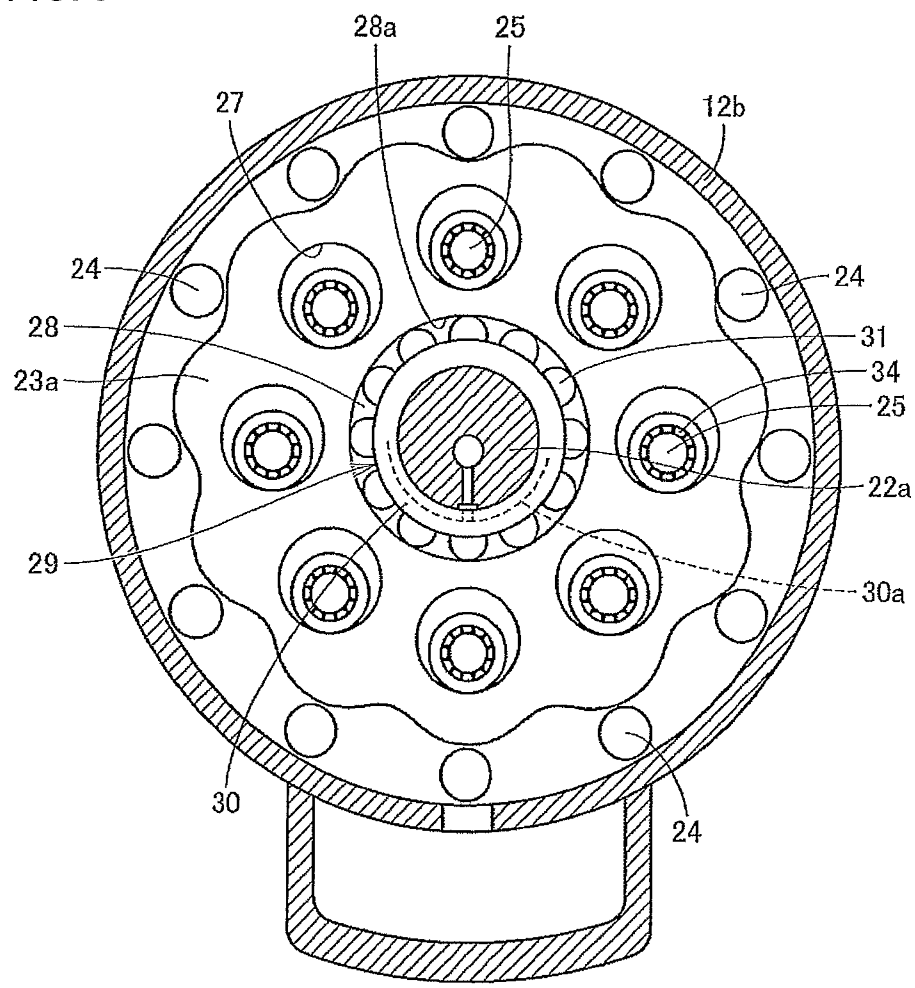
FIG. 5 is a cross-sectional view of the in-wheel motor drive assembly of FIG. 4, taken along the line V-V in FIG. 4.

With reference to the accompanying drawings, an embodiment of the present invention will be described below. Referring to FIGS. 1 to 5, the configuration of an in-wheel motor drive assembly 11 according to the embodiment of the invention will be described. Note that in the following description, "forward" and "front" denote a traveling direction of a vehicle or the front side of the sheet of FIG. 1; "rightward" denotes a direction toward the vehicle body along the rotation axis direction of a wheel or the right side of the sheet of FIG. 1; and "upward" denotes a vertically up direction or the upper side of the sheet of FIG. 1.

The in-wheel motor drive assembly 11 according to the embodiment of the invention includes a motor unit A that generates driving force, a speed reduction unit B that reduces the rotational speed of the motor unit A and outputs the reduced rotation, a wheel hub 26 that transmits the output from the speed reduction unit B to an axle shaft (not shown), a wheel hub bearing unit C that rotatably supports the wheel hub 26, and a casing 12 that houses the components of the motor unit A, speed reduction unit B, and wheel hub bearing unit C. The motor unit A, speed reduction unit B, wheel hub bearing unit C are coaxially aligned in a line.

The motor unit A is a radial gap motor including a motor-unit casing **12*a* that forms a contour of the motor unit A, a stator 13 that is secured to the motor-unit casing 12*a*, a rotor 14 that is arranged so as to face the inner diameter side of the stator 13 with a gap therebetween, and a motor rotary shaft 15 that is fixedly coupled on the inner diameter side of the rotor 14 to rotate together with the rotor 14**.

The motor-unit casing **12*a* is in a cylindrical shape and includes a flange portion 12*e* that is formed at the left end of the motor-unit casing 12*a* and is in the shape of an inward flange spreading radially. This flange portion 12*e* is coupled to the right end of a speed-reduction-unit casing 12*b* which will be described later. The stator 13 is secured along the inner circumference of the motor-unit casing 12*a*. In this embodiment, the flange portion 12*e* is configured to be part of the motor-unit casing 12*a*; however, the flange portion 12*e* can be a component separately prepared from the motor-unit casing 12*a*** and secured thereto with a bolt or the like.

The inner circumference of the flange portion **12*e* of the motor-unit casing 12*a* rotatably supports the left end of the motor rotary shaft 15 with a bearing 16. The motor-unit casing 12*a* includes a motor cover 12*d* at the right end thereof, the motor cover 12*d* being in the shape of a disc extending radially. The center part of the motor cover 12*d* rotatably supports the right end of the motor rotary shaft 15 with a bearing 17**.

The speed reduction unit B includes a speed-reduction-unit casing **12*b* that forms a contour of the speed reduction unit B and a wheel-side rotating member 18 that serves as an output shaft of a speed reducer, and is concentrically disposed on the left side of the motor unit A along the rotation-axis direction. The speed reduction unit B according to this embodiment includes a cycloid speed reducer. The speed reducer has an input shaft 19 extending along the rotation axis so as to project into the motor unit A, and the projecting end is fixedly engaged with the left end of the motor rotary shaft 15. The motor rotary shaft 15** of the motor unit A and the input shaft 19 of the speed reduction unit B rotate together, and the motor rotary shaft 15 and input shaft 19 make up a motor-side rotating member 20. The left end of the input shaft 19 is supported by a bearing 21 in the speed reduction unit B.

Two disc-like eccentric members 22*a*, 22*b* are secured around the outer circumference of the input shaft 19. The motor rotary shaft 15 and input shaft 19 are concentrically aligned with the rotation axis of the motor unit A, but the centers of the eccentric members 22*a*, 22*b* are not aligned with the rotation axis. In addition, the two eccentric members 22*a*, 22*b* are provided such that their phases are shifted by 180° in order to counterbalance the moment generated by centrifugal forces derived from eccentric motion thereof.

Curved plates 23*a*, 23*b*, serving as revolution members, are rotatably held on the outer circumference of the eccentric members 22*a*, 22*b*, respectively. The curved plates 23*a*, 23*b* have outer circumferences that are curved in the shape of waves and engage with a plurality of outer pins 24 serving as outer engagement members. The outer pins 24 are attached along the inner circumference of the speed-reduction-unit casing 12*b*. A center collar 56 is provided in an interstice between the curved plates 23*a* and 23*b* to prevent the curved plates 23*a*, 23*b* from tilting.

The speed-reduction-unit casing 12*b* is in the shape of a cylinder having a diameter smaller than that of the motor-unit casing 12*a* and has the right end in the axis direction connected with the left end of the motor-unit casing 12*a* and the left end in the axis direction connected with the right end of an outer member 12*c*, which is included in the wheel hub bearing unit C. The casing 12 of this embodiment is made up with the motor-unit casing 12*a*, speed-reduction-unit casing 12*b*, and outer member 12*c*. The casing 12 rotatably supports rotating elements housed therein with the aforementioned bearings 16, 17 and the wheel hub bearing unit C which will be described later.

The wheel-side rotating member 18 is an output member of the speed reduction unit B and includes a shaft portion 18*b* extending along the rotation axis and a flange portion 18*a* extending radially outward from the right end of the shaft portion 18*b*. The shaft portion 18*b* of the wheel-side rotating member 18 projects from the speed reduction unit B leftward along the axis direction and extends to the wheel hub bearing unit C. In the flange portion 18*a* disposed in the speed reduction unit B, a plurality of holes are formed at regular intervals along the circumference about the rotation axis. Inner pins 25 are fixedly inserted in the holes.

The outer circumferential surface of the shaft portion 18*b* disposed in the wheel hub bearing unit C is fixedly coupled with the wheel hub 26, and therefore the wheel-side rotating member 18 and wheel hub 26 rotate together. The inner pins 25 fixedly provided in the flange portion 18*a* project from the flange portion 18*a* rightward along the axis direction and the tips of the inner pins 25 are received by through holes 27, which will be described later, provided in the curved plates 23*a*, 23*b*, respectively. A center bore 18*c* defined in the flange portion 18*a* receives the left end of the input shaft 19 and rotatably supports the input shaft 19 with the bearing 21 so that the flange portion 18*a* rotates relative to the input shaft 19.

The curved plate 23*a* has a plurality of waveforms in the form of trochoid curves, such as epitrochoid curves, along its outer circumference, and has a plurality of through holes 27 and 28 penetrating from one side end face to the other side end face. The through holes 27 are equidistantly formed along a circumference with respect to the center (center of axial rotation) of the curved plate 23*a* and, more specifically, are formed in a radially center region between the outer and inner circumference edges of the curved plate 23*a* to receive the aforementioned inner pins 25. The through hole 28 is formed at the center (center of axial rotation) of the curved plate 23*a* and defines the inner circumference of the curved plate 23*a*. The curved plate 23*a* is rotatably mounted on the outer circumference of the eccentric member 22*a* so as to rotate relative to the eccentric member 22*a*.

More specifically, the curved plate 23*a* is rotatably supported by the eccentric member 22*a* with a bearing 29. The bearing 29 is a cylindrical roller bearing including an inner ring 30 that has an inner circumferential surface engaged with the outer circumferential surface of the eccentric member 22*a* and an outer circumferential surface on which an inner raceway 30*a* is formed, an outer raceway 28*a* directly formed in the inner circumferential surface of the through hole 28, a plurality of cylindrical rollers 31 disposed between the inner raceway 30*a* and outer raceway 28*a*, and a retainer (not shown) that retains the intervals between the adjacent cylindrical rollers 31 along the circumferential direction. The bearing 29 is not limited to the cylindrical roller bearing, but can be a deep groove ball bearing. The inner ring 30 further includes a pair of shoulders axially opposed to each other on the inner raceway 30*a* on which the cylindrical rollers 31 roll. The cylindrical rollers 31 are retained between the shoulders.

The structure of the curved plate 23*b* is the same as that of the curved plate 23*a*, and therefore its detailed description is not reiterated.

The outer pins 24 are equidistantly provided along a circumferential track centered around the rotation axis of the input shaft 19. The outer pins 24 extend in parallel with the axis and are held at the opposite ends by outer-pin holders 32 fixedly fitted in an inner wall of the speed-reduction-unit casing 12*b*, which houses the speed reduction unit B, of the casing 12. More specifically, the opposite ends of the outer pins 24 in the axis direction are rotatably supported by needle roller bearings 33 attached to the outer-pin holders 32.

When the curved plates 23*a*, 23*b* make orbital motion about the rotation axis of the input shaft 19, the waveform outer circumference in a curved form engages with the outer pins 24 to cause the curved plates 23*a*, 23*b* to make rotational motion about their own axes. In addition, the needle roller bearings 33 attached to the opposite ends of the outer pins 24 reduce frictional resistance between the curved plates 23*a*, 23*b* when the outer pins 24 abut on the outer circumferential surface of the curved plates 23*a*, 23*b*.

The speed reduction unit B according to this embodiment includes a motion conversion mechanism that converts the rotational motion of the curved plates 23*a*, 23*b* about their own axes into rotational motion about the rotation axis and transmits the rotational motion to the wheel-side rotating member 18. The motion conversion mechanism includes inner pins 25 fixedly provided in the flange portion 18*a* of the wheel-side rotating member 18 and through holes 27 formed in the curved plates 23*a*, 23*b*. Needle roller bearings 34, each made up with a hollow cylinder and needle rollers, are provided on the outer circumferences of the inner pins 25. The needle roller bearings 34 reduce frictional resistance between the curved plates 23*a*, 23*b* when the inner pins 25 abut on the inner circumferential surfaces of the through holes 27 of the curved plates 23*a*, 23*b*.

The right ends of the inner pins 25 are fixedly coupled with an inner-pin reinforcing member 35, which reinforces the inner pins 25, by press-fitting the right ends into the inner-pin reinforcing member 35. The inner-pin reinforcing member 35 has a function of distributing the loads on some inner pins 25 applied by the curved plates 23*a*, 23*b* to all inner pins 25 evenly.

The through holes 27 receive the inner pins 25 at the inside and therefore are arranged at positions corresponding to the inner pins 25. In addition, the diameter of the through holes 27 is designed to be larger by a predetermined size than the outer diameter of the inner pins 25 (denoting "the maximum outer diameter including the outer diameter of the needle roller bearings 34", and the same is applied hereinafter). Therefore, the inner pins 25 extending through the through holes 27 formed in the curved plates 23*a*, 23*b* function as inner engagement members, respectively, engaged with the inner circumferential surface of the through holes 27.

The wheel hub 26 includes a cylindrical hollow portion 26*a* that extends along the rotation axis direction and is coupled with the left end of the wheel-side rotating member 18 and a flange portion 26*b* formed from the right end of the hollow portion 26*a* so as to extend radially outward. The flange portion 26*b* is fixedly coupled to a road wheel (not shown) with hub bolts 39.

The wheel hub bearing unit C is disposed on the left side of the speed reduction unit B in the axial direction concentrically with the speed reduction unit B and rotatably supports the wheel hub 26. The wheel hub bearing unit C includes an outer member 12*c* that forms the contour of the wheel hub bearing unit C, an inner ring 36 that fits with the right end outer circumference of the wheel hub 26, a plurality of rolling elements 37 that are disposed between the outer member 12*c*, wheel hub 26, and inner ring 36, and a retainer 38 that retains the rolling elements 37 at predetermined intervals.

The wheel hub bearing unit C according to this embodiment is a double-row angular ball bearing and has an inner raceway formed on the outer circumferential surfaces of the wheel hub 26 and inner ring 36 and an outer raceway formed on the inner circumferential surface of the outer member 12*c* included in the casing 12.

The in-wheel motor drive assembly 11 according to this embodiment includes suspension arms 40 each having an end coupled to the casing 12 and the other end mechanically coupled to a suspension 60 which supports the vehicle body. Specifically, the suspension arms 40 include a pair of upper arms 40*a*, 40*b*, each having one end coupled to an upper area on the front and rear sides of the speed-reduction-unit casing 12*b* and the other end mechanically coupled to a vehicle-body side member, and a lower arm 40*c* having one end coupled to a lower end of the speed-reduction-unit casing 12*b* and the other end mechanically coupled to the suspension 60.

The attachment structure of the suspension arms 40 will be described in detail below. At an upper front area of the speed-reduction-unit casing 12*b*, an upper-arm attachment portion 41*a* is provided so as to project forward from the outer surface of the speed-reduction-unit casing 12*b*. Similarly, an upper arm attachment portion 41*b* is provided at an upper rear area of the speed-reduction-unit casing 12*b* so as to project rearward from the outer surface of the speed-reduction-unit casing 12*b*. In addition, a lower arm attachment portion 41*c* is provided at a lower end of the speed-reduction-unit casing 12*b* so as to project in a lower right direction. In this embodiment, the lower arm attachment portion 41*c* is a pair of members separated from each other in the front and rear direction.

The upper arm 40*a* on the front side rotatably fits into the front end of the upper-arm attachment portion 41*a*. Similarly, the upper arm 40*b* on the rear side rotatably fits into the rear end of the upper arm attachment portion 41*b*. The lower arm 40*c* is rotatably coupled with the lower-arm attachment portion 41*c* through a shaft portion 42 disposed between the members of the lower-arm attachment portion 41*c*.

In the in-wheel motor drive assembly 11 according to this embodiment, a plurality of sensors 43 are mounted on the casing 12 to detect strains of the casing 12. More specifically, a sensor 43 is mounted on an upper surface 45*a* of the upper-arm attachment portion 41*a*, a sensor 43 is mounted on an upper surface 45*b* of the upper-arm attachment portion 41*b*, a sensor 43 is mounted on a front surface 45*c* of the lower-arm attachment portion 41*c* on the front side, and a sensor 43 is mounted on a rear surface 45*d* of the lower-arm attachment portion 41*c* on the rear side, and thus four sensors 43 in total are mounted on the casing 12.

Each of the sensors 43 of this embodiment includes a sensor element that detects strains and a cover that encloses the sensor element from the outer side. This configuration can prevent the sensor from being broken by spattering of rain water, pebbles or the like.

The sensors 43 are connected to electric cables 44, respectively, that are laid along the outer surface of the speed-reduction-unit casing 12*b* and are connected to a signal processor 46 disposed at the center of the rear end of the speed-reduction-unit casing 12*b*. Thus, the sensors 43 are electrically connected to the signal processor 46, and signals indicating the strains in the casing 12 are detected by the sensors 43 and transmitted to the signal processor 46 that in turn performs signal processing which will be described later.

In this embodiment, the electric cables 44 extending from the sensors 43 are tightly wrapped around the outer surface of the speed-reduction-unit casing 12*b* and are fastened by cable fastening members provided on the speed-reduction-unit casing 12*b*. Laying out the electric cables 44 as described above can prevent the electric cables 44 from vibrating while the in-wheel motor drive assembly 11 is running. This can also prevent the electrical signals passing through the electric cables 44 from noise contamination caused by vibration and also can increase durability of the electric cables 44.

An electric cable 48 extends from the signal processor 46 and is connected to a controller (not shown) mounted on the vehicle body side. The electric cable 48 electrically connects the signal processor 46 and controller that in turn controls the entire in-wheel motor drive assembly based on the calculation results output from the signal processor 46. The control procedure will be described later.

The electric cable 48 extending from the signal processor 46 is fastened by a cable fastening member 49 provided on the motor-unit casing 12*a*. As with the case of the aforementioned electric cables 44, this can prevent the electrical signals from noise contamination caused by vibration and also can increase durability of the electric cable 48.

At the center of the front end of the speed-reduction-unit casing 12*b*, a brake caliper 50 is coupled so as to project forward from the outer surface of the speed-reduction-unit casing 12*b*. This brake caliper 50 is a member that supports a brake which will be described later. The brake provides mechanical braking on the wheel secured to the wheel hub 26. FIG. 1 shows the brake caliper 50 by a dashed line.

Referring to FIGS. 1 to 5, the operation principle of the rotary system of the in-wheel motor drive assembly 11 according to the embodiment will be described.

In the motor unit A, for example, a rotor 14 made of a permanent magnet or magnetic material receives electromagnetic force generated by supplying AC current to a coil of a stator 13, and then rotates. This rotation of the rotor 14 allows a motor rotary shaft 15 connected to the rotor 14 to output rotation that in turn rotates the motor rotary shaft 15 and an input shaft 19. Through eccentric members 22*a*, 22*b* provided on the input shaft 19, curved plates 23*a*, 23*b* make orbital motion around the rotation axis of the input shaft 19. At that time, the outer pins 24 roll on the waveform outer circumference in a curved shape of the curved plates 23*a*, 23*b* so as to engage therewith to cause the curved plates 23*a*, 23*b* to make rotational motion in the reverse direction of the input shaft's 19 rotation.

The inner pins 25, which are inserted into the through holes 27, have a diameter smaller than that of the through holes 27 and abut against the walls of the through holes 27 with the rotational motion of the curved plates 23*a*, 23*b*. Thus, the orbital motion of the curved plates 23*a*, 23*b* is not transmitted to the inner pins 25, but only the rotational motion of the curved plates 23*a*, 23*b* is transmitted to the wheel hub 26 via the wheel-side rotating member 18. In this embodiment, the inner pins 25 provided in the wheel-side rotating member 18 and the through holes 27 receiving the inner pins 25 function as a motion conversion mechanism that converts the rotational motion of the curved plates 23*a*, 23*b* about their own axes into rotation about the rotation axis and transmits the rotation to the wheel-side rotating member 18.

Through the motion conversion mechanism, the wheel-side rotating member 18 extracts the rotational motion of the curved plates 23*a*, 23*b* about their own axes as an output of the speed reduction unit B. Consequently, the rotational speed of the motor-side rotating member 20 is reduced by the speed reduction unit B and is transmitted to the wheel-side rotating member 18.

Referring to FIGS. 1 to 8, the operation of the control system of the in-wheel motor drive assembly 11 according to the embodiment will be described.

Figure 6:
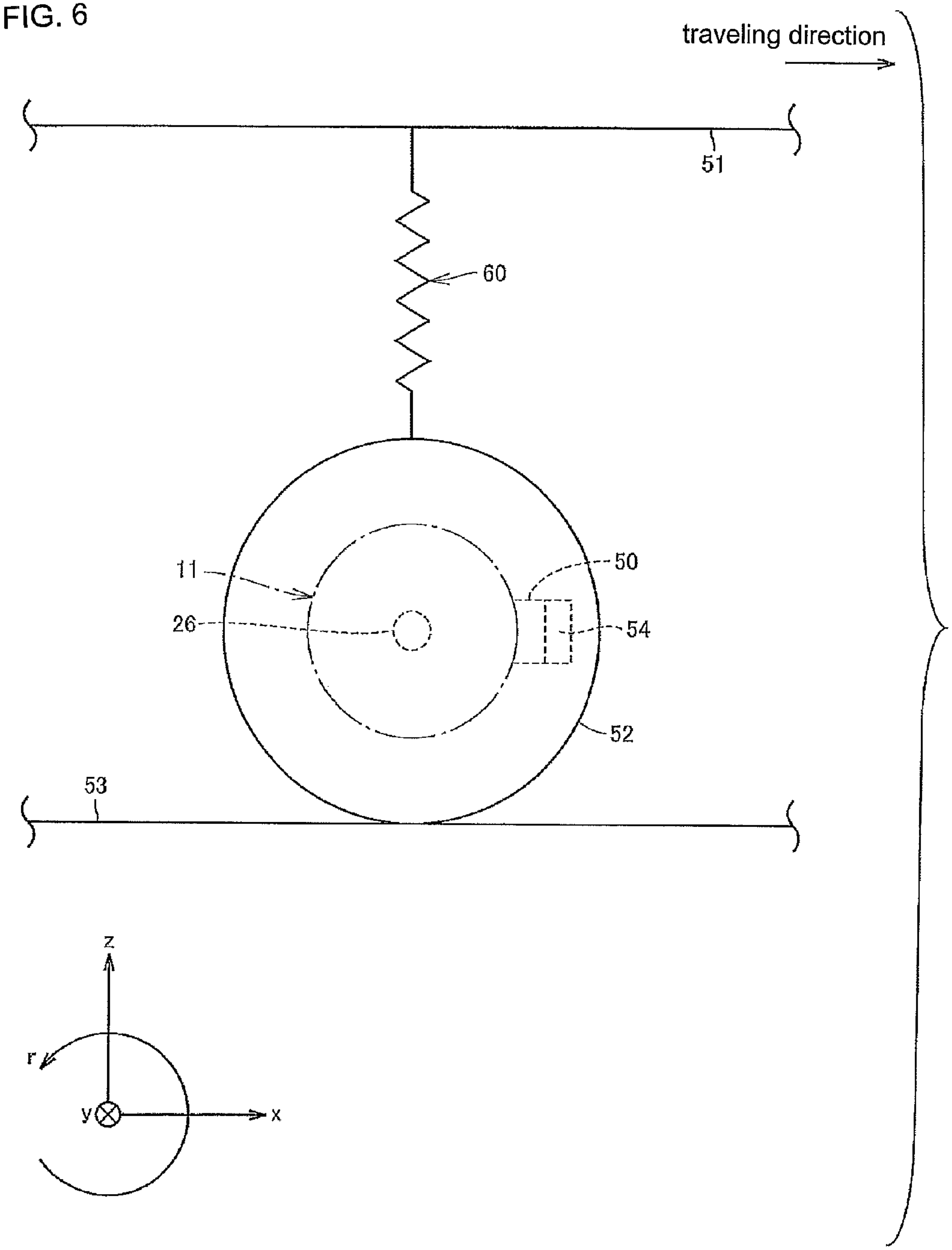
FIG. 6 schematically illustrates a vehicle in which the in-wheel motor drive assembly according to the embodiment of the invention is mounted, viewed in the same direction as that of FIG. 2.
Figure 7:
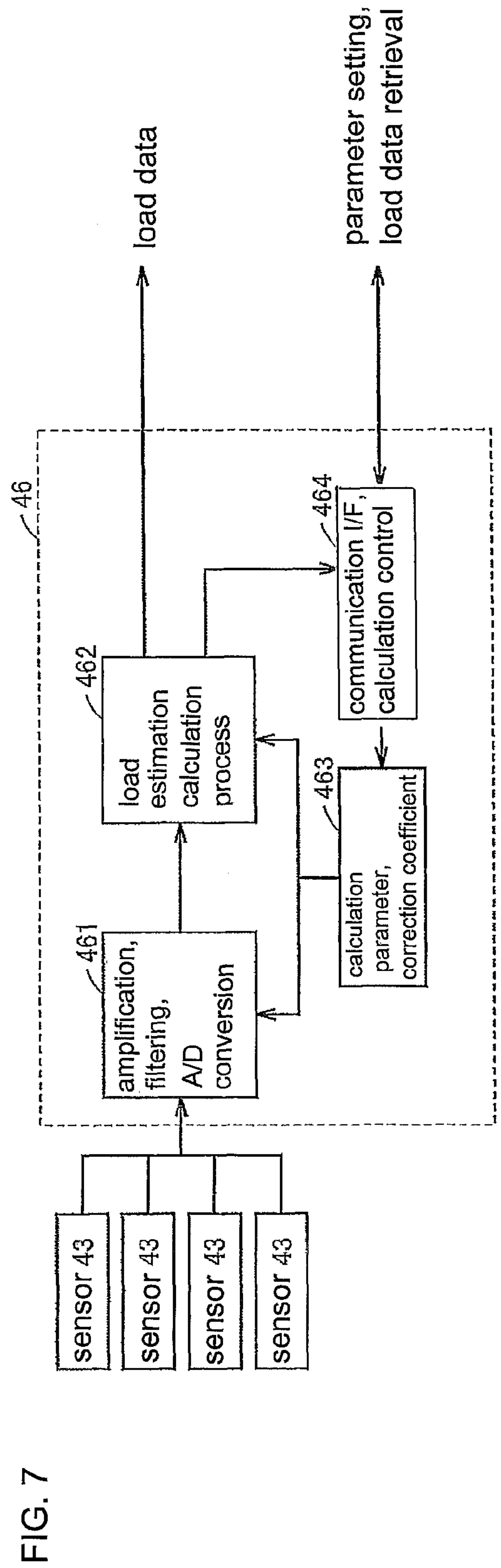
FIG. 7 is a block diagram of sensors and a signal processor according to the embodiment of the invention.
Figure 8:
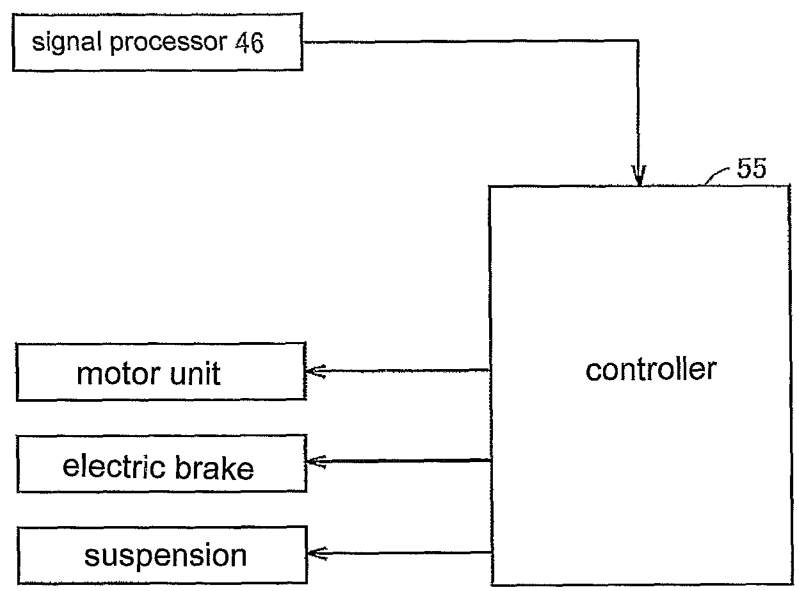
FIG. 8 is a block diagram of a control system of the in-wheel motor drive assembly according to the embodiment of the invention.

As shown in FIG. 6, when the in-wheel motor drive assembly 11 is actuated to start the vehicle 51 running, loads in various directions act on the wheel 52 in accordance with the conditions of contact between the wheel 52 and road surface 53. The loads imposed on the wheel 52 are transmitted to the in-wheel motor drive assembly 11 and thereby cause slight strain in the casing 12.

When a direction along the traveling direction of the vehicle body 51 is represented by direction x, the rotation axis direction of the wheel 52 is represented by direction y, and the vertical direction is represented by direction z, loads imposed on the wheel 52 derived from the condition of contact between the wheel 52 and road surface 53 can be effectively estimated by detecting a strain component in direction x, a strain component in direction y, and a strain component in direction z generated in the casing 12.

On the other hand, when the motor unit A of the in-wheel motor drive assembly 11 is driven, torque is produced between the rotor 14 and stator 13 of the motor unit A and therefore reactive torque is applied to the casing 12 in an opposite direction to the rotational direction of the motor-side rotating member 20. Even when the motor unit A is in regeneration, torque is produced between the rotor 14 and stator 13 and reactive torque is applied on the casing 12. In addition, when a brake 54 supported by the brake caliper 50 applies a mechanical braking force to a disk brake coupled to the wheel hub 26, reactive torque is applied to the casing 12 via the brake caliper 50. Thus, the load imposed on the wheel 52 causes slight strain in the casing 12 as described above.

When the rotational direction of the wheel 52 is represented by direction r, the load imposed on the wheel 52 derived from the motor unit A or a braking force from the brake 54 can be effectively estimated by detecting a strain component in direction r generated in the casing 12.

In the in-wheel motor drive assembly 11 according to this embodiment, a plurality of sensors 43 are mounted on the casing 12 to detect strains in the casing 12. According to the configuration, in addition to the strain components in direction x, in direction y, and in direction z generated in the casing 12, a strain component in the rotational direction r of the wheel 52 can be also detected. By detecting these strain components, the loads imposed on the wheel 52 can be estimated with higher accuracy. The following is a detailed description about the estimation.

Strain detected by sensors 43 mounted on the casing 12 is converted into an electrical signal and then input to a signal processor 46 through electric cables 44. The sensors 43 can be any type of sensors, such as resistance strain sensor (strain gauge) and piezoelectric element, as long as the sensors can convert mechanical displacement into electrical signals.

The signal processor 46 includes a preprocessing section 461, a load estimation section 462, a parameter storage section 463, and a communication section 464 having an I/F function.

The preprocessing section 461 has an amplification function of amplifying output signals from the respective sensors 43, a filtering function of removing noise components from the sensor output signals, and an A/D conversion function of performing A/D conversion on the amplified and filtered sensor output signals. This allows the signal processor 46 disposed in the vicinity of the sensors 43 to convert weak sensor output signals from the sensors 43 into digital signals and thereby makes the signals less susceptible to noise, and hence detection accuracy is enhanced.

The output signals from the sensors 43 contain some amounts of drift due to the temperature characteristics of the sensors 43, the temperature characteristics of the casing 12, and some other factors. Hence, it is necessary to correct the drift of the sensor output signals by the load estimation section 462. The parameters used for the correction are stored in the parameter storage section 463. This parameter storage section 463 may be, for example, a nonvolatile memory. To correct drift caused by temperature, for example, a temperature sensor can be provided near at least one of the sensors 43. The output signal of the temperature sensor is input to the signal processor 46 together with the sensor output signals from the sensors 43 to use for drift correction. In this case, information required for the temperature sensor can be also stored in the parameter storage section 463. According to the configuration, the strain information detected by the sensors 43 is not affected by heat generated from the motor unit A and speed reduction unit B. Therefore, it makes it possible to calculate the loads imposed on the wheel 52 with higher accuracy.

The load estimation section 462 calculates loads on the wheel 52 based on the digitized sensor output signals and various calculation parameters stored in the parameter storage section 463. Configuring the signal processor 46 to perform all calculations on the output signals of the sensors 43 can simplify the system, reduce the number of external wiring cables, and enhance the reliability. Correction coefficients used in load calculations are also stored in the parameter storage section 463 and are retrieved from the parameter storage section 463 when used. The calculation parameters and correction coefficients are set in advance based on values obtained through testing and simulations.

In this embodiment, since the plurality of sensors 43 mounted on the casing 12 can detect the strain component in direction x, strain component in direction y, and strain component in direction z generated in the casing 12 as described above, the load estimation section 462 can effectively calculate the load component in direction x, load component in direction y, and load component in direction z imposed on the wheel 52. In addition, the sensors 43 mounted on the casing 12 are configured to detect a strain component in the rotational direction r generated in the casing 12. Therefore, the load estimation section 462 can effectively calculate the load in the rotational direction r out of loads imposed on the wheel 52 based on information about strain in the rotational direction r.

The load data obtained through calculations by the load estimation section 462 is transmitted from the communication section 464 via the electric cable 48 to a controller 55 disposed on the vehicle body side. As the electric cable 48, for example, a CAN bus is applicable. This configuration makes it possible not only to transmit the load data from the signal processor 46 to the controller 55, but also to allow the controller 55 on the vehicle body side to set the various calculation parameters, which are to be stored in the parameter storage section 463, via the CAN bus.

The controller 55 can obtain information about contact conditions between the wheel 52 and road surface 53 and information about mechanical braking force applied to the wheel 52 by the brake 54 on the basis of the load data obtained through calculations by the load estimation section 462.

Specifically, the information about the contact conditions between the wheel 52 and road surface 53 can be obtained on the basis of the load component in direction x, load component in direction y, and load component in direction z imposed on the wheel 52.

In addition, the load in the rotational direction r obtained through calculations by the load estimation section 462 is a combined force of a regenerative braking force from the motor unit A and a mechanical braking force applied by the brake 54. On the other hand, the regenerative braking force of the motor unit A can be estimated by referring to torque command values and motor current command values provided to the motor unit A. Therefore, the controller 55 can obtain the mechanical braking force of the brake 54 by subtracting the regenerative braking force of the motor unit A from the value of the load in the rotational direction r.

Attenuation sections of the motor unit A, brake 54, and suspension 60 are connected to the output side of the controller 55. The controller 55 uses the information about the contact conditions between the wheel 52 and road surface 53 obtained as described above to control the motor unit A and the attitude of the vehicle. This can enhance safety and cost effectiveness. For example, in order for the vehicle 51 to smoothly turn around, the controller 55 can output the aforementioned information to the motor unit A to control the rotational speed of the right and left wheels 52. In addition, the controller 55 can output the aforementioned information to the brake 54 to control braking so as not to lock the wheels 52 during the braking operation. In order to prevent the vehicle body from greatly inclining rightward or leftward during cornering and to prevent the vehicle body from greatly inclining frontward or rearward during acceleration or braking, the controller 55 can output the aforementioned information to the attenuation section of the suspension 60 to control the suspension. Furthermore, the controller according to this embodiment can optimally perform cooperative control on regeneration of the motor unit A and the brake 54 based on the information about mechanical braking force applied to the wheel 52 by the brake 54.

As described above, this embodiment can advantageously control the turning and attitude of the vehicle 51, brake lock and other operations in accordance with the conditions of contact between the wheel 52 and road surface 53. In addition, the calculated mechanical braking force of the brake 54 can be utilized to keep a balance with the regenerative braking force generated through regeneration of the motor unit A, thereby cooperatively controlling the braking forces. The cooperative control enables more sophisticated control over the in-wheel motor drive assembly.

Since the sensors 43 according to this embodiment are disposed away from the rolling elements 37 of the wheel hub bearing C, the noise components that come from the rolling elements 37 during orbital motion to the sensors 43 can be reduced. This noise reduction can simplify calculation processing and shorten the time delay caused by filtering processing. In short, the loads imposed on the wheel 52 can be calculated through simpler algorithms with higher accuracy.

According to this embodiment, the sensors 43 are mounted in the vicinities where the suspension arms 40 are coupled with the casing 12. The sensors 43 that are mounted in the coupling areas where pronounced strain appears can thus effectively detect strain generated in the casing 12.

For the sensors 43, an element that can detect loads in a plurality of directions by itself may be used. This configuration can reduce the number of sensors to be used, thereby reducing manufacturing costs.

Although the sensors are mounted on the speed-reduction-unit casing in this embodiment, the present invention is not limited thereto and any number of the sensors can be mounted anywhere on the casings.

Although the sensors are mounted on the outer surface of the speed-reduction-unit casing in this embodiment, the present invention is not limited thereto and the sensors can be mounted on the inner surface of the casing. This configuration can protect the sensors from spattering of rain water, pebbles or the like, thereby preventing the sensors from being broken due to these factors.

Although the signal processor is mounted on the casing in this embodiment, the present invention is not limited thereto and the signal processor can be disposed on the vehicle body side.

The foregoing has described the embodiment of the present invention by referring to the drawings. However, the invention should not be limited to the illustrated embodiment. It should be appreciated that various modifications and changes can be made to the illustrated embodiment within the scope of the appended claims and their equivalents.

INDUSTRIAL APPLICABILITY

The present invention provides an in-wheel motor drive assembly controllable with high accuracy and simpler configuration, and is advantageously used in, for example, vehicle manufacturing fields of the automobile industry.

REFERENCE SIGNS LIST

11 in-wheel motor drive assembly
12 casing
12*a* motor-unit casing
12*b* speed-reduction-unit casing
12*c* outer member
12*e*, 18*a*, 26*b* flange portion
18*b*, 42 shaft portion
12*d* motor cover
13 stator
14 rotor
15 motor rotary shaft
16, 17, 21, 29, 33, 34 bearing
18 wheel-side rotating member
19 input shaft
20 motor-side rotating member
22*a*, 22*b* eccentric member
23*a*, 23*b* curved plate
24 outer pin
25 inner pin

26 wheel hub
26*a* hollow portion
27, 28 through hole
30, 36 inner ring
28*a*, 30*a* raceway
31 roller
32 outer-pin holder
35 inner-pin reinforcing member
37 rolling element
38 retainer
39 hub bolt
40*a*, 40*b* upper arm
40*c* lower arm
41*a*, 41*b* upper arm attachment portion
41*c* lower arm attachment portion
43 sensor
44, 48 electric cable
45*a*, 45*b*, 45*c*, 45*d* surface
46 signal processor
461 preprocessing section
462 load estimation section
463 parameter storage section
464 communication section
47, 49 cable fastening member
50 brake caliper
51 vehicle
52 wheel
53 road surface
54 brake
55 controller
60 suspension
56 center collar.

The invention claimed is:

1. An in-wheel motor drive assembly comprising:

a motor unit that drivingly rotates a motor-side rotating member;

a speed reduction unit that reduces a rotational speed of the motor-side rotating member and transmits reduced rotation to a wheel-side rotating member;

a wheel hub that is fixedly coupled to the wheel-side rotating member;

a wheel hub bearing that rotatably supports the wheel hub;

a casing that covers the motor unit and the speed reduction unit;

a plurality of sensors that are mounted on the casing and capable of detecting strain generated in the casing; and a signal processor that calculates load imposed on a wheel on the basis of strain signals output from the sensors;

wherein the signal processor is capable of calculating loads in at least three directions imposed on the wheel and rotational torque generated in a rotational direction r of the wheel based on output signals from the sensors, and the three directions include a direction x along a traveling direction of the vehicle, a rotation axis direction y of the wheel, and a vertical direction z.

2. The in-wheel motor drive assembly according to claim 1, wherein the sensors are mounted on an inside of the casing.

3. The in-wheel motor drive assembly according to claim 1, therein the sensors are mounted on an outside of the casing and enclosed by a cover from an outer side.

4. The in-wheel motor drive assembly according to claim 1, further comprising:

suspension arms each having one end coupled to the casing and another end coupled to a suspension supporting a vehicle body, wherein the sensors are mounted in vicinities where the suspension arms are coupled to the casing.

5. The in-wheel motor drive assembly according to claim 1, wherein each of the sensors is capable of detecting strain in a plurality of directions by itself.

6. The in-wheel motor drive assembly according to claim 1, wherein an electric cable extending from each of the sensors is fastened by a cable fastening member provided on the casing.

7. The in-wheel motor drive assembly according to claim 1, wherein the signal processor is capable of calculating rotational moment generated around the direction x and rotational moment generated around the vertical direction z.

8. The in-wheel motor drive assembly according to claim 1, wherein the signal processor is connected to a controller provided on a vehicle body side with a CAN bus, and the signal processor includes an I/F section that allows the control unit to set calculation parameters required to calculate load imposed on the wheel.

9. The in-wheel motor drive assembly according to claim 1 further comprising:

a controller that is provided on a vehicle body side and controls the driving of the in-wheel motor drive assembly, wherein the controller compares rotational torque generated in rotational direction r of the wheel obtained through calculations by the signal processor and regenerative torque generated by the motor unit to calculate a ratio between a mechanical braking force produced by a mechanical brake and a regenerative braking force produced by the motor unit in a regeneration state.

10. The in-wheel motor drive assembly according to claim 9, wherein the controller controls the driving of the in-wheel motor drive assembly on the basis of the ratio between the mechanical braking force and the regenerative braking force.

* * * * *